United States Patent
Yang

(10) Patent No.: US 8,745,644 B2
(45) Date of Patent: Jun. 3, 2014

(54) DRIVING CIRCUIT FOR AN OPTICAL DISC DRIVE

(75) Inventor: Hyeon-jun Yang, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/564,164

(22) Filed: Aug. 1, 2012

(65) Prior Publication Data

US 2013/0125150 A1    May 16, 2013

(30) Foreign Application Priority Data

Nov. 11, 2011  (KR) .................. 10-2011-0117688

(51) Int. Cl.
  *G11B 33/12*  (2006.01)

(52) U.S. Cl.
  USPC .................. 720/601; 720/602; 369/30.27

(58) Field of Classification Search
  USPC ............... 369/30.27, 30.99; 720/601–602
  See application file for complete search history.

(56) References Cited

U.S. PATENT DOCUMENTS

| | | | | |
|---|---|---|---|---|
| 4,376,292 A | * | 3/1983 | Mignolet | .......... 360/66 |
| 4,682,839 A | * | 7/1987 | Bryce | .......... 439/598 |
| 6,134,206 A | | 10/2000 | Furukawa et al. | |
| 6,489,728 B2 | * | 12/2002 | Guthrie et al. | .......... 315/200 A |
| 6,653,798 B2 | * | 11/2003 | Guthrie et al. | .......... 315/200 A |
| 7,929,383 B2 | * | 4/2011 | Yamazaki et al. | .......... 369/30.27 |
| 2002/0183804 A1 | * | 12/2002 | Malaney et al. | .......... 607/48 |
| 2009/0086603 A1 | * | 4/2009 | Kuroda | .......... 369/100 |
| 2011/0199331 A1 | * | 8/2011 | Otagaki et al. | .......... 345/174 |

FOREIGN PATENT DOCUMENTS

| | | |
|---|---|---|
| JP | 02-248195 | 10/1990 |
| JP | 2006155779 A * | 6/2006 |
| KR | 10-2005-0080868 A | 8/2005 |

OTHER PUBLICATIONS

Korean Office Action issued Jan. 14, 2013 in counterpart Korean Patent Application No. 10-2011-0117688 (4 pages, in Korean).

* cited by examiner

*Primary Examiner* — Wayne Young
*Assistant Examiner* — Carlos E Garcia
(74) *Attorney, Agent, or Firm* — NSIP Law

(57) ABSTRACT

Provided is a driving circuit for an optical disc drive. The driving circuit includes a digital control processor (DCP) comprising an input port to which a signal for driving a tray is input, and an output port outputting a voltage representing an operating state of the optical disc drive. The driving circuit also includes a tray switch that is connected to the input port, an operation display lamp that is connected in parallel with the tray switch, and an electric connection device for connecting the input port and the output port to each other.

13 Claims, 4 Drawing Sheets

DRIVING CIRCUIT FOR AN OPTICAL DISC DRIVE

CROSS-REFERENCE TO RELATED APPLICATION(S)

This application claims the benefit under 35 USC §119(a) of Korean Patent Application No. 10-2011-0117688, filed on Nov. 11, 2011, in the Korean Intellectual Property Office, the entire disclosure of which is incorporated herein by reference for all purposes.

BACKGROUND

1. Field

The following description relates to an optical disc drive, and more particularly, to an optical disc drive including a simplified switch circuit disposed on an optical disc tray.

2. Description of Related Art

A typical half-height (H/H) type optical disc drive includes a tray for carrying a disc into and out of the H/H optical disc drive, and two switches for detecting an open state and a closed state of the tray. The H/H optical disc drive typically includes a tray switch for opening the tray and an operation indicator lamp indicating an operating state of the H/H optical disc drive. The tray switch and the operation indicator lamp are independently connected to separate ports included in a digital signal processor (DSP) or a digital control processor (DCP).

In designing an optical disc drive, it is cost beneficial to reduce the number of components that are used and also reduce the processing steps for making the product.

SUMMARY

In an aspect, there is provided a driving circuit of an optical disc drive, the driving circuit including a digital control processor (DCP) comprising an input port configured to receive a signal for driving a tray that supports an optical disc, and an output port configured to output a voltage representing an operating state of the optical disc drive, a tray switch connected to the input port, an operation display lamp that is connected in parallel with the tray switch, and an electric connection device connecting the input port and the output port.

The electric connection device may comprise a resistor.

A pull-up resistor may be connected to the input port.

The tray switch and the operation display lamp may be exposed on an outer portion of the optical disc drive, the DCP may be disposed in the optical disc drive, and terminals of the tray switch and the operation display lamp which are connected in parallel may be connected to the input port via a wire.

The wire may comprise a flexible ribbon type cable.

In an aspect, there is provided an optical disc drive including a tray configured to support a disc, a main frame configured to receive and eject the tray, a driving motor configured to drive the tray, an optical pickup corresponding to the disc, a driver configured to drive the driving motor and the optical pickup, a digital control processor (DCP) that is connected to the optical pickup and the driver, the DCP comprising an input port and an output port, a tray switch connected to the input port, an operation display lamp that is connected to the tray switch in parallel, and an electric connection device that connects the input port and the output port of the DCP.

The tray switch and the operation display lamp may be exposed on an outer portion of the optical disc drive, the DCP may be disposed in the optical disc drive, and terminals of the tray switch and the operation display lamp which are connected in parallel may be connected to the input port via a wire.

The wire may comprise a flexible ribbon type cable.

A pull-up resistor may be connected to the input port.

The optical disc drive may further comprise a main base installed in the main frame, wherein the optical pickup is mounted on the main base, and a driving power transmission system configured to transmit a driving power between the driving motor and The main frame may be a half-height (H/H) main frame.

The electric connection device may comprise a resistor.

Other features and aspects may be apparent from the following detailed description, the drawings, and the claims.

Figure 1:
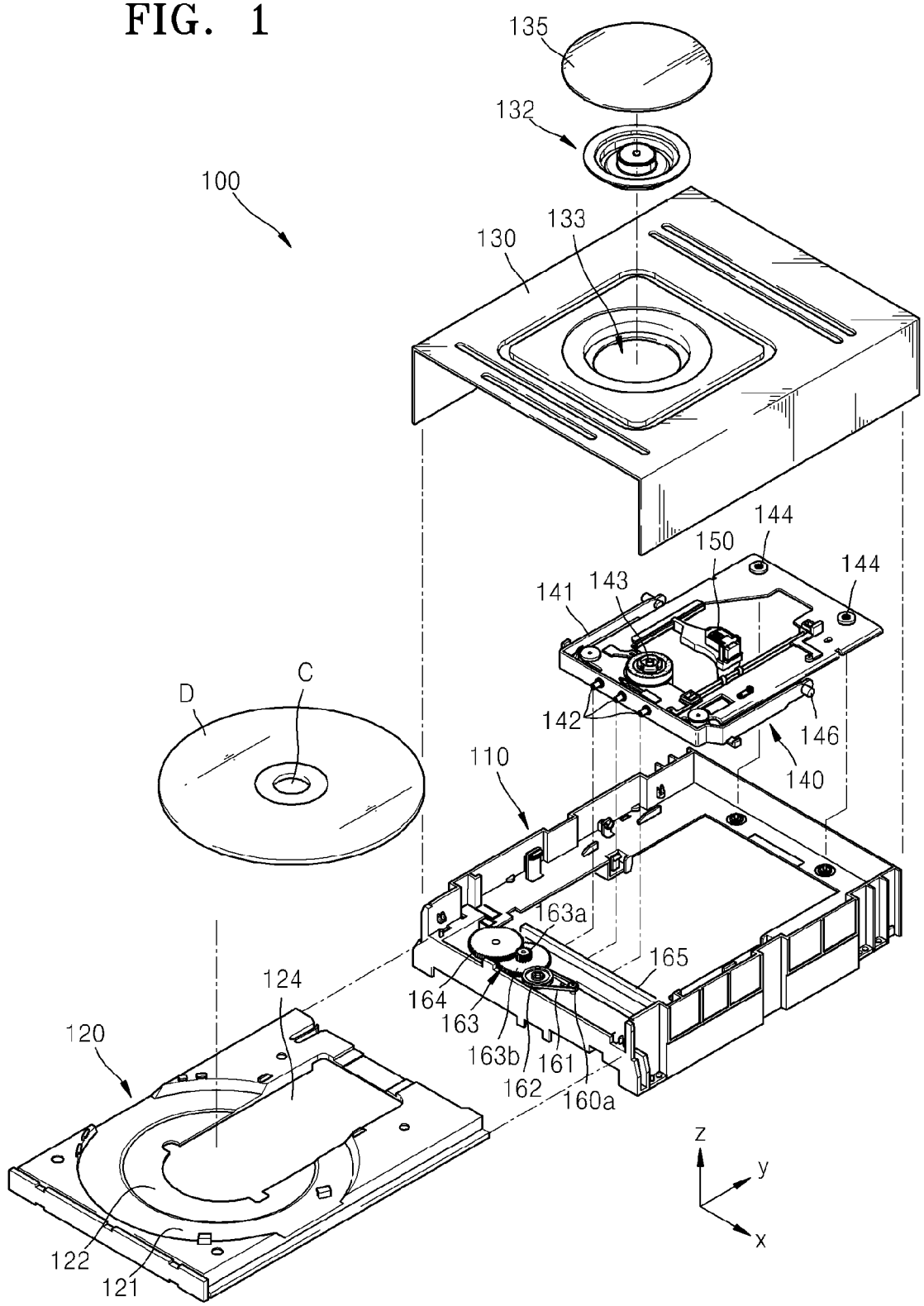
FIG. 1 is a diagram illustrating an example of an exploded perspective of an optical disc drive.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an exploded perspective view of an optical disc drive 100.

Referring to FIG. 1, the optical disc drive 100 includes a main frame 110, a tray 120, and a cover 130. An optical disc D having a center hole C may be mounted on the tray 120. The tray 120 with the optical disc D mounted therein can enter and exit the main frame 110. The cover 130 is coupled to the main frame 110 and covers the main frame 110 so that an inside of the main frame 110 is not exposed. For example, the main frame 110 may be a half-height (H/H) main frame. A clamper 132 for fixing the optical disc D on a turntable 143 is mounted in the cover 130. The clamper 132 is inserted in an opening 133 that is formed in the cover 130. In this example, the opening 133 is closed by a cap 135 to prevent the clamper 132 from being exposed.

The tray 120 includes a first mounting portion 121 on which the optical disc D having a diameter of, for example, 120 mm may be mounted, and a second mounting portion 122 on which an optical disc (not shown) having a diameter of, for example, 80 mm may be mounted. The first mounting portion 121 is recessed from a peripheral portion thereof so that the optical disc D having the larger diameter such as 120 mm may be mounted thereon. The second mounting portion 122 is recessed from the first mounting portion 121 so that the optical disc having the smaller diameter such as 80 mm may be mounted thereon. A window 124 is formed in the tray 120 so that the turntable 143 may approach the optical disc D when the tray 120 is inserted in the main frame 110 and light irradiated from an optical pickup unit 150 may be incident to the optical disc D.

The optical disc drive 100 also includes a main base 140 that is rotatable with respect to the main frame 110 in an up-and-down direction, and a rotary-type sub-base 141 guiding the up-and-down movement of the main base 140 using a rotary shaft 146 that is rotatably coupled to the main frame 110. The turntable 143 for rotating the optical disc D at a high speed, and the optical pickup unit 150 for irradiating light onto the rotating optical disc D and for receiving light reflected from the optical disc D to record or reproduce information to or from the optical disc D are mounted on the main base 140.

Figure 3:
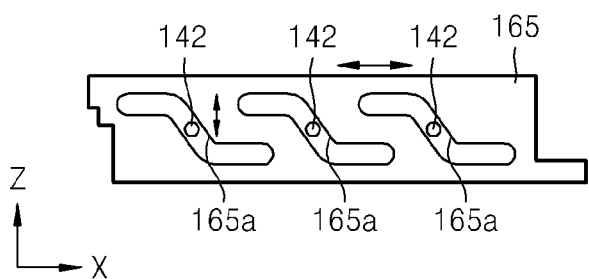
FIGS. 3 and 4 are diagrams illustrating examples of a front view and a plan view of a main slider included in the optical disc drive of FIG. 1.

The main base 140 may be rotatably coupled to the main frame 110 by fixing a fixing recess 144 at a rear edge portion thereof to the main frame 110 using a screw via an elastic rubber spacer. The rotary-type sub-base 141 that rotates with respect to a main slider 165 may be coupled to a leading edge portion of the main base 140, and the main base 140 may be rotated by the main slider 165 that reciprocates in synchronization with an operation of the tray 120. A plurality of guide pins 142 are disposed on an intermediate portion of the rotary-type sub-base 141. The plurality of guide pins 142 guide the direction of the main base by contacting recesses in the main slider 165, an example of which is shown in FIG. 3.

In this example, a driving power transmission system may be used to power the tray 120 and the main slider 165 and may include a driving motor 160 that has a driving pulley 160a, a rubber belt 161, a driven pulley 162, a main gear 163, and a tray driving gear 164. An example of the driving power transmission system is further described with reference to FIG. 5.

Figure 2:
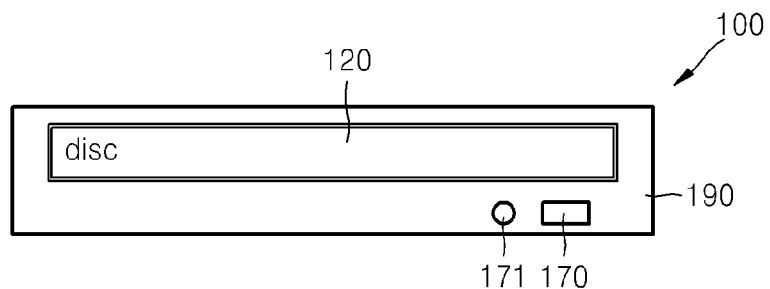
FIG. 2 is a diagram illustrating an example of a front view of the optical disc drive of FIG. 1.

FIG. 2 illustrates an example of a front view of the optical disc drive 100, and shows a state in which a tray switch 170 for opening/closing the tray 120 and an operation display lamp 171 for indicating an operating state of the optical disc drive 100 are installed in a front panel 190.

Referring to FIG. 2, the tray switch 170 is exposed on an outer portion of the optical disc drive 100 to be used to open and close the tray 120. For example, a user may press the tray switch 170 or a remote control may be used to trigger the tray switch 170. The tray switch 170 is connected to a digital control processor (DCP) that is disposed in the optical disc drive 100. When the tray switch 170 is pushed, the DCP that is connected to the tray switch 170 controls the driving gear 164 to open or close the tray 120.

The operation display lamp 171 may be, for example, a light emitting diode (LED), and is connected to the DCP to flicker according to an operating state of the optical disc drive 100.

The driving motor 160 is driven by the operation of the tray switch 170. Accordingly, the opening/closing of the tray 120 and the elevating/descending operations of the main base 160 may occur in response to the tray switch 170 being operated.

FIG. 3 illustrates an example of a front view of the main slider 165, and shows examples of cam-recesses 165a in which the guide pins are 142 are inserted. As shown in FIG. 3, the guide pins 142 inserted in the cam-recesses 165a interfere in an up-and-down direction (z-axis direction) while moving along the cam-recesses 165a, when the main slider 165 reciprocates in a left-and-right direction (x-axis direction). In the example of FIG. 3, as the main base 140 moves in the X direction, the cam-recesses 165a guide the guide pins 142 in a Z direction, thus, causing the main base 140 to move in the X direction. For example, as the main base 140 moves in a +X direction, the guide pins 142 and the cam-recesses 165a cause the main base 140 to move in a –Z direction.

Figure 4:
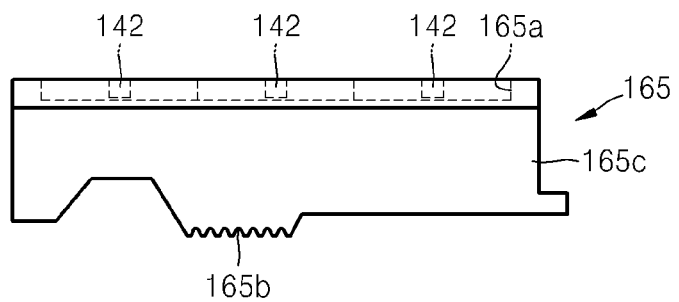
Figure 5:
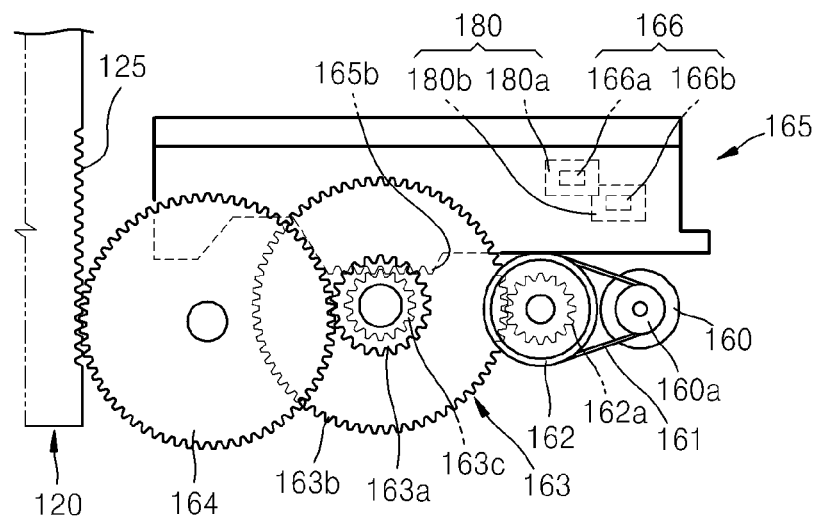
FIG. 5 is a diagram illustrating an example of a driving power transmission system in the optical disc drive of FIG. 1.

FIG. 4 illustrates an example of a plan view of the main slider 165, and shows a spur gear 165b that is engaged with an operating gear to receive a moving power of the main slider 165 in a left-and-right direction. FIG. 5 illustrates an example of a driving power transmission system for operating the main slider 165 and the tray 120.

Referring to FIG. 4, a flange portion 165c extends in a transverse direction and is formed at an intermediate portion on a rear surface of the main slider 165. The spur gear 165b is formed on an intermediate portion of the flange portion 165c. A switch operating portion 166, including protrusions 166a and 166b (refer to FIG. 5) for detecting opening/closing of the tray 120, is disposed on a bottom surface of the flange portion 165c. A tray location detection switch 180, including two switches 180a and 180b respectively corresponding to the protrusions 166a and 166b, is disposed on a lower portion of the switch operating portion 166.

In this example, a location of the main slider 165 varies depending on the opening/closing state of the tray 120. Accordingly, turning-on/off states of the switches 180a and 180b changes due to the protrusions 166a and 166b. The switches 180a and 180b are connected to the DCP described above. The DCP determines the opening/closing states of the tray 120, for example, a complete open state (OPEN), a complete closed state (CLOSE), and a middle position (MIDDLE) of the tray 120 based on the states of the two switches 180a and 180b.

Referring to FIG. 5, the driving power transmission system interacts with the tray 120 and the main slider 165. For example, the driving pulley 160a of the driving motor 160 may be connected to the driven pulley 162 via a rubber belt 161. A first transfer gear 162a is formed on a lower portion of the driven pulley 162. The first transfer gear 162a is engaged with a first main gear 163b of the main gear 163. A second main gear 163a and a third main gear 163c, which are respectively engaged with the tray driving gear 164 and a spur gear 165b of the main slider 165, are formed on and under the first main gear 163b. The tray driving gear 164 is engaged with a spur gear 125 that is disposed at an inner side of the tray 120. In this example, the opening and closing of the tray 120 is detected by the tray switch 170 driven by the main slider 165.

Figure 6:
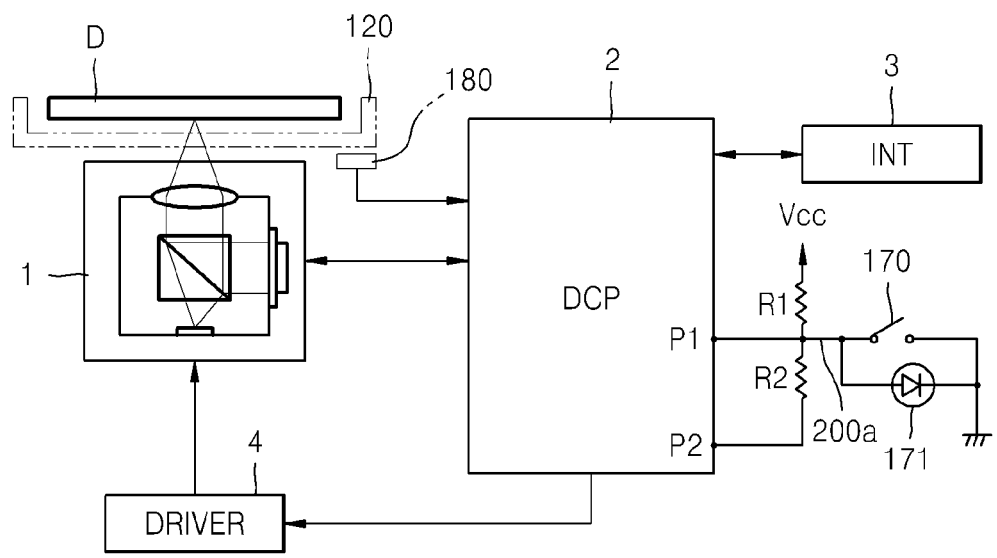
FIG. 6 is a diagram illustrating an example of an optical disc drive.

FIG. 6 illustrates an example of a circuit diagram of the optical disc drive.

Referring to FIG. 6, a light source (not shown) and a photodetector (not shown) of an optical pickup 1 are connected to a DCP 2, and a spindle motor and a sled motor are connected to a motor driver 4. The DCP 2 may also be connected to an interface 3 for connecting to an external host apparatus.

The DCP 2 may include a radio frequency (RF) amplifier, a codec, and a servo unit, like in a general DCP. The tray switch 170 may be directly connected to a first port P1 of the DCP 2. In addition, the first port P1 and a second port P2 may be directly connected to each other via an electric connection device, for example, a port protective resistor R2. In this example, the operation display lamp 171 is connected in parallel with the tray switch 170.

According to various aspects, terminals of the tray switch 170 and the operation display lamp 171 may be connected to the first port P1 of the DCP 2 via a single wire 200a. For example, the wire 200a may correspond to one line of a flexible ribbon type cable used in the optical disc drive 100.

Figure 7:
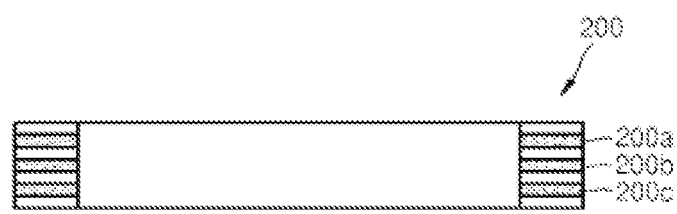
FIG. 7 is a diagram illustrating an example of a flexible flat cable to which an optical disc drive is applied.

FIG. 7 illustrates an example of a flexible ribbon type cable 200 having three wires 200a, 200b, and 200c. According to various aspects, wire 200a of the plurality of wires may be used to connect the tray switch 170 and the operation display lamp 171.

Referring again to FIG. 6, the first port P1 is an input port to which a signal for driving the tray 120 is input. The first port P1 may detect variation in impedance of the tray switch 170 according to the opening/closing of the tray 120. The second port P2 is an output port that applies a voltage to the operation display lamp 171. For example, the second port P2 may apply a voltage of 3.3 V, and the like, to the operation display lamp 171.

The port protective resistor R2 may protect the first port P1. A pull-up resistor R1 for stably operating the first port P1 may be selectively connected to the first port P1. The pull-up resistor R1 may be used if the first port P1 operates unstably, and may not be used in other cases. A source voltage Vcc of the DCP 2, for example, 3.3 V, may be applied to the pull-up resistor R1. The operation display lamp 171 has an internal resistance, and accordingly, the first port P1 maintains a high impedance (HIGH) provided that the tray switch 170 is opened, and the impedance of the first port P1 enters a low state (LOW) when the tray switch 170 is closed.

When the optical disc drive 100 operates, the second port P2 may output a voltage, for example, 3.3 V, which drives the operation display lamp 171. In the above-described structure, the operation display lamp 171 may be driven in two levels, for example, high and middle levels. When the tray switch 170 is pushed, the low level impedance is detected and the tray 120 is driven. Here, the pull-up resistor R1 and the port protective resistor R2 are used to drive the operation display lamp 171 at the high level and the middle level. The two resistors, namely, the pull-up and the port protective resistors R1 and R2, may be set such that the operation display lamp 171 may operate at the high level and the middle level respectively when the second port P2 of the DCP 2 is driven to be high (HIGH) and low (LOW). Here, the middle level may be set as a level at which the operation display lamp 171 does not flicker.

Figure 8:
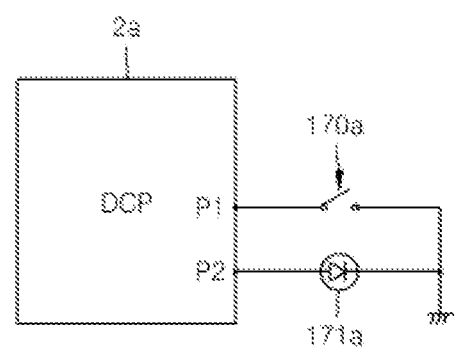
FIG. 8 is a circuit diagram illustrating a related example of an interconnection structure between a tray switch and an operation display lamp.

FIG. 8 illustrates an example of a circuit diagram showing an interconnection structure in which a switch 170a and an operation display lamp 171a are connected to two ports of a DCP via independent wires in a conventional optical disc drive. In this example, the two ports are connected to each other in a structure where the two ports of the DCP are respectively connected to the tray switch 170 and the operation display lamp 171, so that the tray switch 170 and the operation display lamp 171 are driven through a net.

According to various aspects, a tray switch and an operation display lamp are connected using a single wire, instead of two wires as in the conventional art. Accordingly, there is provided a cable and a connector that have less lines than that of the conventional optical disc drive. As a result, costs for components may be reduced and the number of processes for manufacturing the optical disc drive may be reduced.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A driving circuit of an optical disc drive, the driving circuit comprising:
a digital control processor (DCP) comprising an input port configured to receive a signal for driving a tray that supports an optical disc, and an output port configured to output a voltage representing an operating state of the optical disc drive;
a tray switch connected to the input port;
an operation display lamp that is connected in parallel with the tray switch, wherein terminals of the tray switch and the operation display lamp are connected in parallel to the input port of the DCP using a single wire; and
an electric connection device connecting the input port and the output port.

2. The driving circuit of claim 1, wherein the electric connection device comprises a resistor.

3. The driving circuit of claim 1, wherein a pull-up resistor is connected to the input port.

4. The driving circuit of claim 1, wherein the tray switch and the operation display lamp are exposed on an outer portion of the optical disc drive, and the DCP is disposed in the optical disc drive.

5. The driving circuit of claim 4, wherein the single wire comprises a flexible ribbon type cable.

6. The driving circuit of claim 1, wherein the configuration of the driving circuit enables the display lamp to emit multiple levels.

7. An optical disc drive comprising:
a tray configured to support a disc;
a main frame configured to receive and eject the tray;
a driving motor configured to drive the tray;
an optical pickup corresponding to the disc;
a driver configured to drive the driving motor and the optical pickup;
a digital control processor (DCP) that is connected to the optical pickup and the driver, the DCP comprising an input port and an output port;
a tray switch connected to the input port;
an operation display lamp that is connected to the tray switch in parallel, wherein terminals of the tray switch and the operation display lamp are connected in parallel to the input port of the DCP using a single wire; and
an electric connection device that connects the input port and the output port of the DCP.

8. The optical disc drive of claim 7, wherein the tray switch and the operation display lamp are exposed on an outer portion of the optical disc drive, and the DCP is disposed in the optical disc drive.

9. The optical disc drive of claim 8, wherein the single wire comprises a flexible ribbon type cable.

10. The optical disc drive of claim 7, wherein a pull-up resistor is connected to the input port.

11. The optical disc drive of claim 7, further comprising:
a main base installed in the main frame, wherein the optical pickup is mounted on the main base; and
a driving power transmission system configured to transmit a driving power between the driving motor and the tray.

12. The optical disc drive of claim 9, wherein the main frame is a half-height (H/H) main frame.

13. The optical disc drive of claim 7, wherein the electric connection device comprises a resistor.

\* \* \* \* \*